United States Patent [19]

Sarlos

[11] 4,245,913

[45] Jan. 20, 1981

[54] SCANNING AND DETECTING DEVICE

[76] Inventor: Seppo E. Sarlos, Kontiont, 1, Esbo 21, Finland

[21] Appl. No.: 886,829

[22] Filed: Mar. 15, 1978

[30] Foreign Application Priority Data

Mar. 22, 1977 [SE] Sweden .............................. 7703294

[51] Int. Cl.³ ........................................... G01N 21/89
[52] U.S. Cl. .................................. 356/431; 250/572; 356/445
[58] Field of Search .............. 356/416, 419, 430, 431, 356/445, 446, 447, 448; 350/271; 250/572; 315/139, 144, DIG. 1

[56] References Cited

U.S. PATENT DOCUMENTS

| 3,027,490 | 3/1962 | Craig | 315/144 |
|---|---|---|---|
| 3,849,004 | 11/1974 | Cofek | 350/271 X |
| 3,942,021 | 3/1976 | Barr et al. | 356/431 |
| 3,967,895 | 7/1976 | Crook | 350/271 X |
| 3,981,590 | 9/1976 | Perkins | 356/419 X |
| 3,988,530 | 10/1976 | Ikegami et al. | 356/430 X |

FOREIGN PATENT DOCUMENTS 1412990 11/1975 United Kingdom ..................... 356/430

Primary Examiner—John K. Corbin
Assistant Examiner—Bruce Y. Arnold
Attorney, Agent, or Firm—Birch, Stewart, Kolasch & Birch

[57] ABSTRACT

A scanning and detecting device is disclosed which reflects radiation off an object and detects this radiation in order to establish irregularities or faults in a face of the object. Lighting fixtures light the object and the reflected light is detected by three detecting cameras placed over a slit in a screen. The size of the slit is adjusted to provide uniform reflected light intensity in the absence of imperfections. The size of the slit is controlled by the use of thin metal bands which are adjusted by cam screws and are clamped by adjustable clamps.

14 Claims, 5 Drawing Figures

SCANNING AND DETECTING DEVICE

The present invention is concerned with a device for detecting radiation from an object in order to establish irregularities or faults in one face thereof by means of a stationary scanning and detecting unit.

A device of the type in question will find special application in a sawmill for the purpose of sorting and obtaining the best economic value from timber in the form of "green" boards, seasoned boards or planks transported by a conveyor and edged and crosscut in accordance with rules related to the quality of the timber.

Due to the fast-rising prices of raw materials it is becoming increasingly important to be able to scan green boards rapidly and correctly to enable the best possible use to be made of the timber, and the invention is principally intended to make such scanning possible.

Sawn Nordic pine and spruce is sorted into the qualities "unsorted timber", "fifths" and "sixths". This sorting is generally carried out on the basis of visible deviations and faults only. These include the presence of:
 (a) wane,
 (b) knots,
 (c) blue stain,
 (d) rot,
 (e) bark,
 (f) cracks,
 (g) attack by insects,
 (h) deviations in the shape of the timber,
 (i) irregularities, and
 (j) variations in the direction and spacing of the growth rings.

The quality of the timber is a function of the above factors, i.e. the nature, number, size and position of the faults. Naturally, it is economically preferable to sort the timber so that as large a fraction of it as possible falls into the better classes. The ratio between the selling prices of unsorted timber and sixths, for example, can be as great as 2:1.

It is preferable to proceed in a consistent manner when sorting, so that the grounds of appraisal are always the same. But the traditional, visual appraisal is entirely subjective. There are indeed rules for the classification of timber, but in practice it is very hard to follow the rules with the precision that could be desired. The difficulties are partly bound up with the usually rapid pace of work. It turns out to be especially time-consuming to effect optimum selection, which involves deciding whether it is more profitable to produce a short piece of high-quality timber or a long piece of lower quality.

Thus there is an evident need for a more objective and faster device for the sorting of timber by quality. Such a device would make it possible to increase the sales value of the timber, while buyers would obtain a more even quality. Moreover, sorting could be effected more quickly.

A scanning and detecting device of the type mentioned in the introductory paragraph is principally characterized in this invention in that the scanning and detecting unit itself is set up to receive radiation through a slit in a screen, the said slit being variable in width along its length and positioned at an angle to the direction of feed of the object passing below it. The slit shall extend, in the main, across the entire extent of the object, and the scanning and detecting unit shall preferably comprise a number of detectors arranged in a line parallel to the slit.

The invention will now be described in closer detail below in the form of an example of embodiment, with reference to the appended drawings. The example of embodiment is particularly concerned with the scanning of "green" boards and planks transported on a conveyor at a sawmill, but, naturally, the scanning and detecting device can also be used in many other applications for scanning a face of any object.

Figure 1:
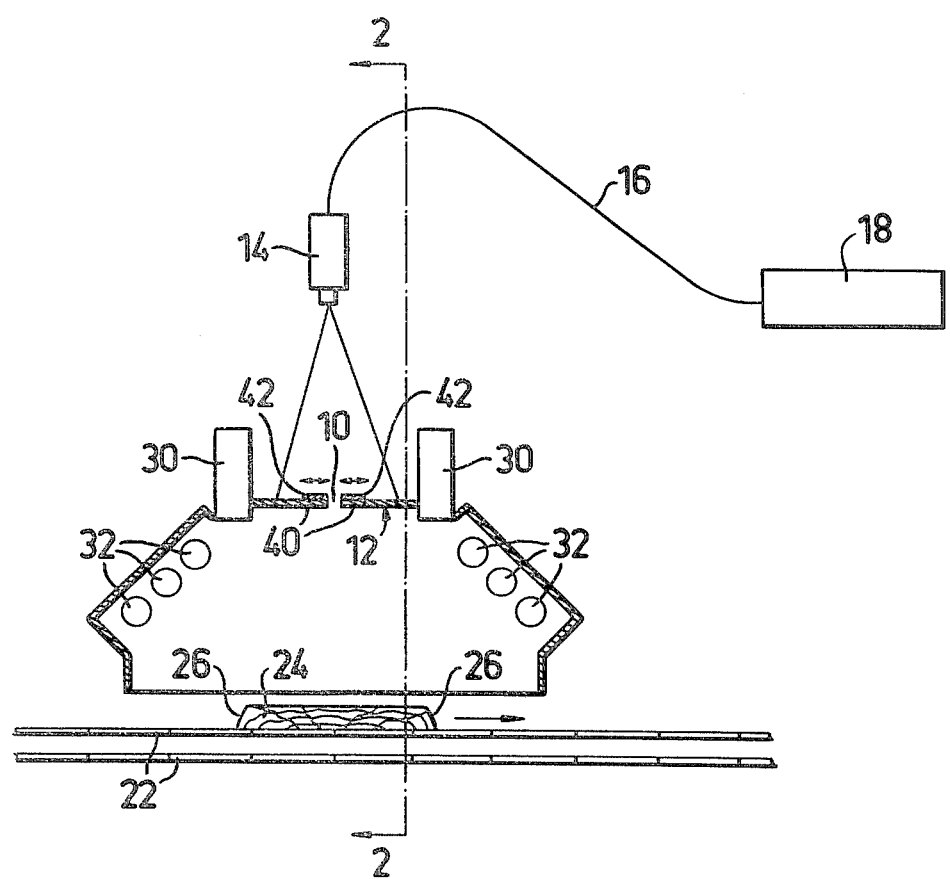
FIG. 1 is an end elevation of a scanning and detecting device designed on the principles of the invention for scanning a green board being transported on a conveyor, together with a quantizing device linked thereto.
Figure 2:
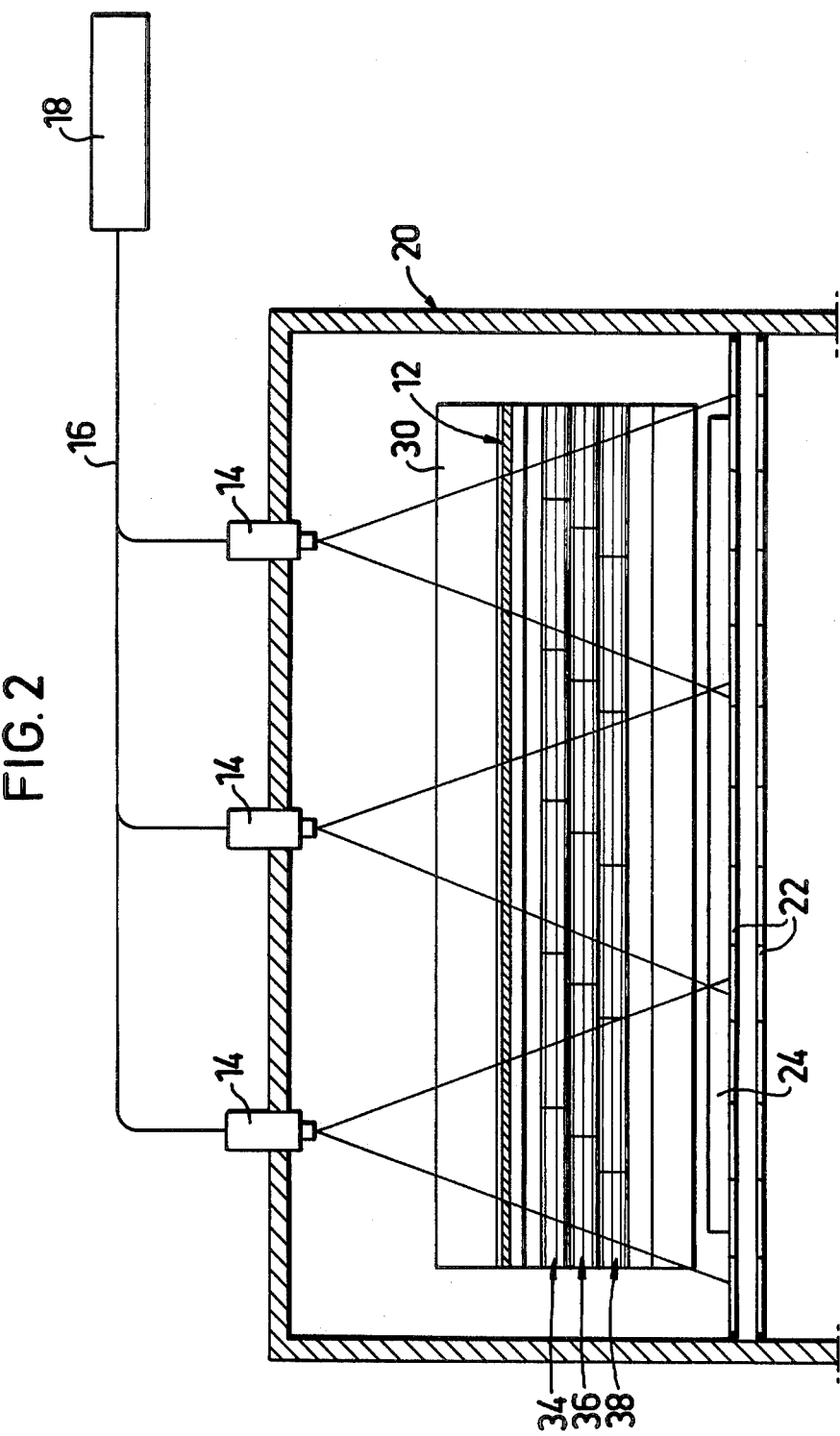
FIG. 2 is a side view, in section along line 2—2 in FIG. 1, of the new scanning and detecting device with the quantizing device linked thereto.
Figure 3:
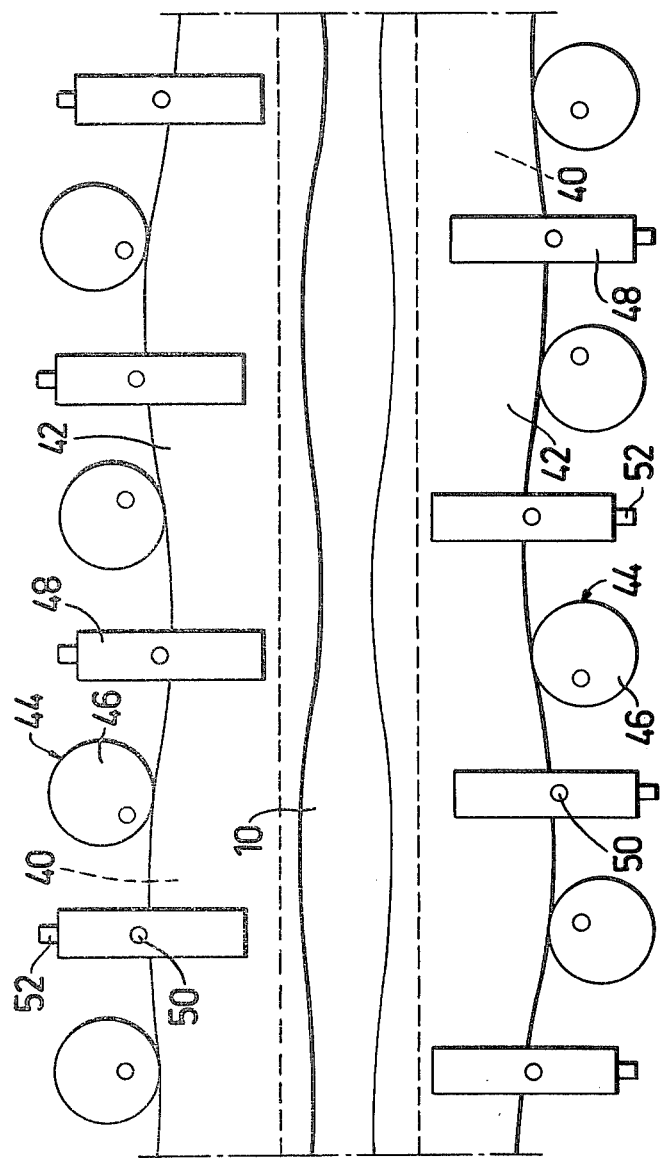
FIG. 3 is a plan of a special design of the screen and slit of the new scanning and detecting device.

The main principles of the new scanning and detecting device are especially apparent from FIGS. 1 to 3. The device comprises, in this embodiment, a scanning and detecting unit consisting of three scanning cameras 14, arranged above and parallel to a slit 10 in a screen 12 and linked by an electric cable 16 to a computer facility 18. The computer facility 18 is capable of quantizing the output of the detecting cameras 14, derived from the radiation detected thereby, and the quantized values can be used directly for controlling an edging and/or cross-cutting device. The actual link between the computer facility 18 and the edging and/or cross-cutting device (not illustrated) is not indicated on the drawing, as it is not an intrinsic part of the invention. The three cameras 14 are located in a frame 20 over a chain conveyor 22 (shown in part only) which is designed for transporting green boards 24 one after the other in the direction indicated by the arrow in FIG. 1. The boards 24 are, as illustrated, provided with "wanes" 26 facing upwards, i.e. away from the conveyor 22, upon which the boards are transported sideways. FIG. 1 shows a board 24 passing immediately below the field scanned by the cameras 14. The photosensitive elements 28 of the cameras 14, consisting of diodes, will thus scan the entire top face of the green board 24 as the latter passes beneath the slit 10 in the screen 12. In the case illustrated, the slit 10 extends at right angles, more or less, to the direction of feed of the board 24, and its length spans the entire length of the board 24. To ensure that the cameras 14 will detect only that part of the board 24 which is visible through the slit, the space above the screen 12 is screened off by side screens 30, the top side of the screen 12 and the insides of the side screens 30 being painted black.

Above the conveyor 22, on each side of the field of view of the cameras 14, there are lighting means 32 designed to illuminate the board 24 evenly and uniformly over the entire upper face thereof. The lighting means 32 comprise, in the present case, three fluorescent fittings 34, 36, 38 on each side of the slit 10. The fittings 34, 36, 38 are preferably connected to different phases of a 380 V alternating supply so that the illumination is practically constant at all times. The uniformity of the illumination is further promoted inasmuch as the ends of the lighting means 32, namely fluorescent tubes, in the several fittings 34, 36, 38, are located at different points along the length 10 of the slit, as illustrated in FIG. 2.

Figure 4:
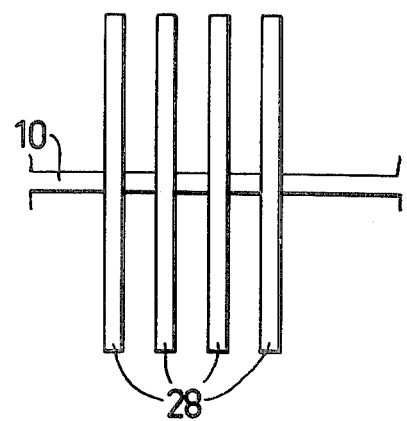
FIG. 4 is a plan of the location of the photosensitive elements of the new scanning and detecting device in relation to the slit in the screen.

To enable accurate scanning to be effected by means of a scanning and detecting device of the type outlined above, it is vital that the width of the slit 10 in the screen 12 can be adjusted along the entire length of the slit. Thus, when the device is calibrated, i.e. set, with a smooth surface, not a board, beneath the slit 10, the scanning cameras 14 must register exactly the same illumination along the entire length of the slit 10. It should be noted that the photosensitive diode elements 28 in conventional cameras of the type intended can vary greatly in sensitivity due to their small size. However, compensation can be made for the differences in the sensitivity of the diode elements 28 by adjusting the width of the slit 10 along its length. In the set-up intended, as is particularly shown in FIG. 4, the diode elements 28 in the cameras 14 are positioned at right angles to the longitudinal extension of the slit 10 in such a manner that the visible radiation reaching the cameras 14 through the slit 10 will fall on the diode elements 28 near the midpoints of the latter. Due to the difficulty of positioning the small diode elements 28 in the cameras 14, the said diode elements are often not arranged exactly in a straight line, but the resulting disadvantages are eliminated by the above central arrangement of the diodes above the slit 10, and the image registered by the cameras 14 will be straight provided that the slit 10 itself is straight. The sensitivity of the diodes 28 may of course change during use. By adjusting the width of the slit 10, however, compensation can be made for this as well. Further, inasmuch as the slit 10 has sharp edges, the variation in the sensitivity of the diode elements 28 at the active parts thereof is less marked. The ability to adjust the width of the slit 10 also obviates the necessity of replacing the scanning cameras 14, or of adjusting the distance of the latter from the slit 10 in the screen 12, if for instance the feed rate of the conveyor 22 is altered. As a corollary, it is also easy to compensate for the effect of distance on the illumination by an equivalent adjustment of the width of the slit 10. It may also be necessary to adjust the width of the slit 10 at certain points along its length after replacing a fluorescent tube or if there are differences in the illumination from the different tubes 32.

FIG. 3 shows, not necessarily to scale, a slit 10 between two metal elements 40 (indicated by dashed lines) which form the screen 12 previously mentioned. Two thin metal bands 42, placed over the metal elements 40 and flexible under lateral pressure, provide the ability to adjust the width of the slit as desired. For this purpose, the illustrated embodiment is provided with screw elements 44 located along the sides of the slit 10 and having eccentric heads 46 that exert force on the outer longitudinal edge of each metal band 42. The screw elements 44 may, for example, be driven in the metal elements 40 by means of a key (not illustrated), to force the corresponding metal band 42 into the desired position in the vicinity of the screw element 44. The metal bands 42 are preferably clamped at their ends in such a manner that they always exert a certain force on the respective rows of screw elements 44. Between and alternating with the screw elements 44 on each side of the slit 10 are detachable means 48 for holding down each of the metal bands 42 so that the latter, once positioned, can be clamped against the metal elements 40. The means 48 are preferably arranged to be locked by means of screws 50 in their desired position with respect to a groove 52 in the metal element 40, which groove forms a right angle, more or less, with the slit 10.

Figure 5:
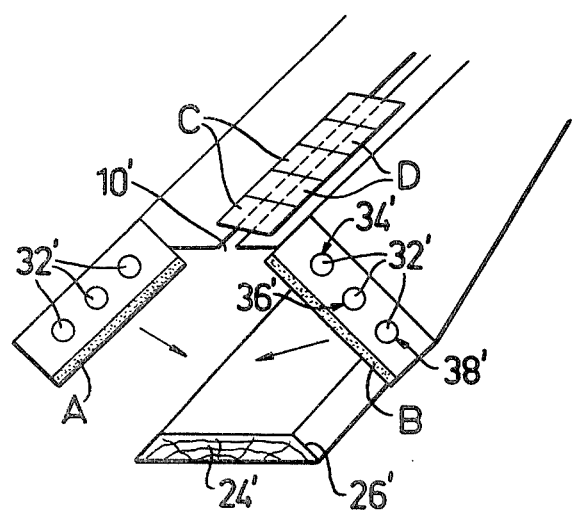
FIG. 5 is a perspective of a modified version of part of the scanning and detecting device illustrated in FIGS. 1 and 2.

FIG. 5 illustrates a slit 10', lighting means 32', and light filters associated with the said elements, in connection with a somewhat modified version of the scanning and detecting device described above. In this case, a filter A is provided between the green board 24' and the fluorescent tubes 32' shown on the left of the figure, and a filter B between the green board 24' and the fluorescent tubes 32' shown on the right of the figure. Furthermore, in this embodiment of the invention, light filters C and D are fitted alternately along the length of the slit 10'. Light within wavelength range A will now pass through filter A in the direction indicated by the arrow at the left. Light within wavelength range B will pass through filter B in the direction indicated by the arrow at the right. The filters C are designed to transmit light within wavelength range A only, and the filters D are designed to transmit light within wavelength range B only. This arrangement enables the cameras described above to register a "spiky" partial image, e.g. of an area of a green board 24' having wanes 26'.

Naturally, the above-mentioned scanning and detecting device can be modified within the terms of the invention. Thus, the metal band described above for bounding the slit may be replaced with some other diaphragm element. For example, separate band elements might be provided with overlaps between neighboring screw elements, each band element being held in place by a holding-down element of the type described above.

Further, the sensitivity and effectiveness of the device may be improved by providing a lens system between the scanning and detecting unit and the object to be scanned. The lens system might, for instance, comprise one or more cylindrical lenses set up parallel to the slit, preferably between the slit and the scanning and detecting unit, so that the rays are refracted in one direction. Such cylindrical lenses can be made of segments cut lengthwise from glass tubes.

I claim:

1. A device for detecting radiation from an object for detecting irregularities or faults on one face thereof comprising:

scanning and detecting means for receiving radiation; and adjustable slit means disposed in a screen for continuously passing radiation to said scanning and detecting means through the whole of said slit means, wherein said adjustable slit means includes, adjustable band means for controlling the amount of radiation passing through said slit means to said stationary scanning and detecting means, eccentric cam means for applying a force to the edges of said adjustable band means to adjust the opening between said adjustable band means to control the size of said slit, and clamp means to positively lock said adjustable band means flat against the screen to hold the size of said slit constant after adjustment thereof.

2. The device of claim 1 wherein said scanning detecting means further comprises a number of detectors arranged in a line parallel to the slit.

3. The device of claim 1 further comprising lighting means for emitting the radiation in a visible form and providing a substantially uniform distribution of the radiation.

4. The device of claim 3 wherein said lighting means comprises fluorescent lamps arranged in parallel rows one one side of said screen and one each side of said slit along the entire length of said slit.

5. The device of claims 1, 3, or 4 further comprising lens system means positioned in the path of the radiation between said scanning and detecting means and said object being scanned.

6. The device of claim 5, wherein said lens system means includes one or more cylindrical lenses positioned to refract the light in one direction.

7. The device of claim 6, wherein the cylindrical lenses are positioned between said scanning and detecting means and the said slit.

8. A device for detecting radiation reflected from an object for establishing irregularities or faults particularly on the edges of the object thereof comprising:
   means for projecting a first wavelength of radiation to said object at a first angle of incidence;
   means for projecting a second wavelength of radiation to said object at a second angle of incidence different from the first angle;
   slit means disposed in a screen for continuously passing radiation through the whole of said slit;
   scanning and detecting means for receiving radiation; and
   first and second filter means for passing the first and second radiation wavelength reflected by said object, said first and second filters being alternately disposed in said slit means, the first filters passing the first wavelength and the second filters passing the second wavelength, whereby the object topography may be determined by the use of a composite of the two wavelengths received by said stationary scanning and detecting means.

9. The device of claim 8 wherein each of said means for projecting first and second wavelengths includes three fluorescent light assemblies arranged on each side of said slit, said assemblies being connected to different phases of an alternating supply so that the illumination is practically constant at all times.

10. The device of claims 8 or 9 further comprising lens system means positioned in the path of the radiation between said scanning and detecting means and said object being scanned.

11. The device of claim 10 wherein said lens system means includes one or more cylindrical lenses positioned to refract the light in one direction.

12. The device of claim 11 wherein the cylindrical lenses are positioned between said scanning and detecting means and said slit.

13. The device of claim 8 wherein said scanning detecting means further comprises a number of detectors arranged in a line parallel to the slit.

14. The device of claim 8 wherein each scanning and detecting means includes photosensitive camera means for transmitting an output derived from the detected radiation in the form of electrical pulses to a computer facility designed to quantize the output.

* * * * *